March 4, 1952     W. A. VAN DER WILT     2,587,931

BRAKE ADJUSTER

Filed Aug. 9, 1948

Inventor,
W. A. Van Der Wilt,
By Frederick E. Maynard,
Attorney.

Patented Mar. 4, 1952

2,587,931

UNITED STATES PATENT OFFICE 2,587,931

BRAKE ADJUSTER

Wien A. Van Der Wilt, Glendale, Calif.

Application August 9, 1948, Serial No. 43,205

5 Claims. (Cl. 188—79.5)

This invention is a wear take-up or adjuster assembly for hydraulic, brake setting pistons.

Such pistons are pressed outwardly in a common cylinder to apply a braking force to respective brake shoes.

It is an object of the invention to provide the pistons with a chuck device which will automatically set in the cylinder against inward movement, except as hereinafter explained, and will permit ready outward brake pressure action, and will automatically compensate for wear of the brake linings.

A further aim of the invention is to provide a self-chucking piston which may be readily substituted for originally installed pistons and requires no change in the cylinder or other brake elements. And to provide a chucking piston which is simple, rugged, reliable, and is capable of ready removal from piston installed position.

Noticeably, a purpose of the invention is to provide a chuck piston which involves a means which will automatically set the piston at gradually outward changing position due to brake wear, but, particularly, will still allow for a required inshift of a piston so as to prevent constant drag of the brake lining on the wheel drum of the brake.

Further, an intent of the invention is to provide a chuck piston and tool assembly which greatly facilitates the outward, endwise retraction of a given piston without interference by the clutch features whose function is to prevent, normally, such an end direction of shift.

The invention resides in certain advancements in this art as set forth in the ensuing disclosure and has, with the above, additional objects and advantages as will be made evident, and whose constructions, associations, combinations and sub-combinations, and details of means and the manner of operation will be made manifest in the following description of the herewith illustrative mechanism; it being understood that modifications, variations, adaptations and equivalents may be resorted to within the scope, spirit and principles of the invention as it is claimed in conclusion hereof.

Figure 1:
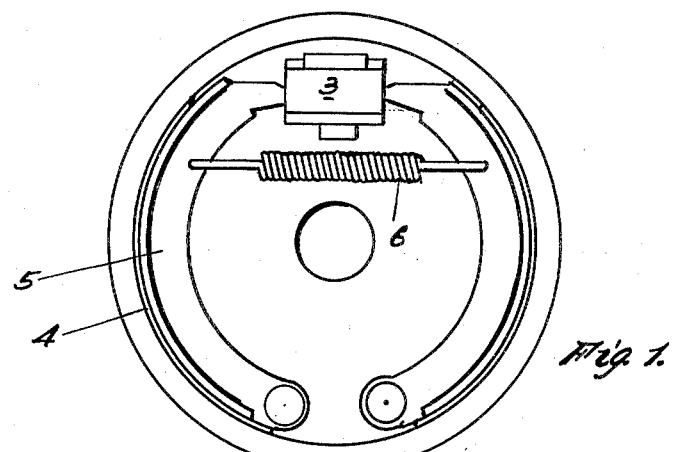
Figure 1 is a side elevation of the associated brake shoes and the mounted hydraulic cylinder.

In the instant embodiment the invention includes a pair of duplicate piston heads 2 from which outwardly project reduced bodies 2b having external threaded portions 12t. The piston heads freely slidably fit in a common hydraulic cylinder 3 wherein liquid pressure is effective on the pistons to force them outward with equal pressure to effectively press the linings 4, on brake shoes 5 against a respective brake shell or drum.

A tension spring 6 tends to constantly retract the shoes from the drum.

It is obvious that there is material wear of the linings under heavy pressure loads when the brakes are applied by the hydraulic pressure in the cylinder.

Therefore, each piston is provided with automatic means which, while permitting easy installation of the piston in one direction into an open end of the cylinder, will automatically clutch onto the bore of the cylinder when the piston moves in an opposite direction, and further the clutch means is featured by a capacity or function of permitting a small degree of backlash to normally idle the linings from the adjacent drum bore.

Non-rotatively but slidably mounted for backlash on the piston body 2b is a substantial ring 7 fitting freely in the bore of the cylinder 3 and having a plurality of peripheral windows 8 from which slightly project respective clutch balls 9 which are adapted to be forced into locking engagement with the bore of the cylinder as the balls roll up on the bottom (or contiguous) surface of ball pockets 10 which pitch downwardly and rearwardly (Fig. 2) as to the right hand end piston. The balls are under constant upthrust effect of respective expansion springs 11 in the pockets; the outer ends of the springs being seated on the near face of the piston head 2 which serves as a means for holding the springs in their pockets. While the balls project slightly for clutching function the windows 8 are of a size to prevent their escape thereat.

The ball ring 7 is limited in its back-lash shift by a retaining nut 12 which is screwed onto piston body threads 12t.

While a clutch piston can be bodily pushed into one end of the cylinder in a direction which will push back its clutch balls and therefore pushed to the far end of the cylinder (as from the left end to the right end, Fig. 2) it is desirable that the set of balls 9, of the left end piston, be retracted to permit its insertion into the cylinder, subsequent to installation of the right end piston (or vice versa). To that end, the retainer nut 12 cooperates with a means whereby to collectively repress the set of clutch balls in its piston to such a degree that the assembled piston can be quickly installed in its immediate position in an end of the piston so that the piston does not necessarily have to be pushed from one end of the cylinder to the other during make up of the hydraulic mechanism.

As here shown the nut 12 is provided with a number of needle holes 12n in which are movable push-rods 13 so arranged as to engage respective clutch balls when the rods are concurrently pushed inwardly in the needle holes. To effect this concurrent rod action the rods are fixed in a knurled collar 14 to which manual finger pressure can be applied to press the rods forcibly against the balls to effect de-clutching action, either for installation or removal of the given piston.

Figure 2:
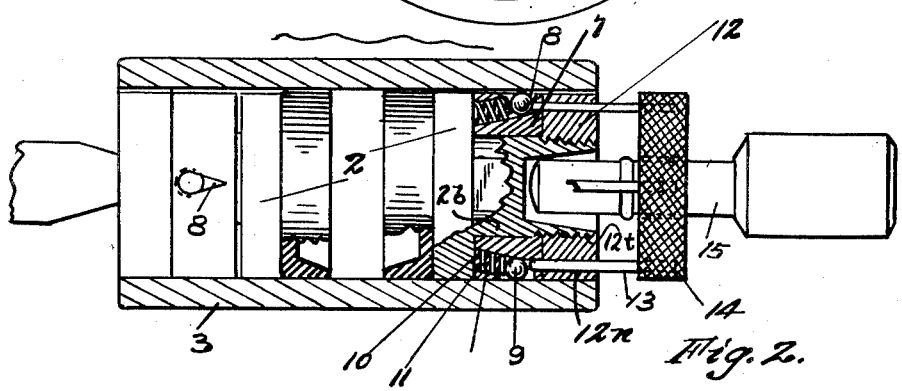
Figure 2 is an axial section of the assembly of the piston and the handling tool; some parts being in elevation.

The outer end of the piston body 2b, Fig. 2, is recessed for normal reception of the brake shoe horn 5. If desired the collar may be mounted slidably on an axial ram rod 15 so that after the push-rods 13 have repressed the clutch balls, preparatory to piston installation, then the ram rod can be pushed in to abut the axially adjacent end of the piston body 2b, Fig. 2, to facilitate pushing the piston into its end of the cylinder. When a piston is to be removed the ram rod serves as a convenient support for the collar.

The associated collar and ram rod constitute a handy tool.

It will be seen that while a piston ring 7 is automatically clutched at successive outward positions in its cylinder as a lining wears down the back-lash of the ring between the piston head 2 and the retaining nut 12 allows the piston per se to contract with the brake shoe to prevent objectionable drag of the lining on its drum. This back-lash is a very small fraction of an inch, say about .015".

Figure 3:
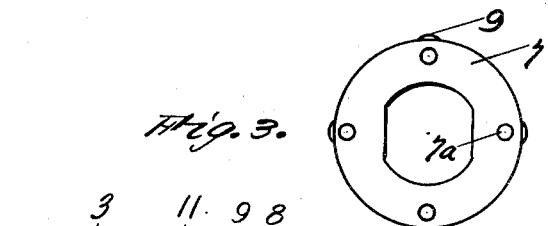
Figure 3 is an end elevation of the clutch ring.
Figure 4:
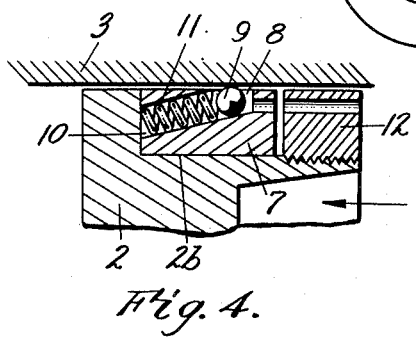
Figure 4 is a detail longitudinal section of a portion of the piston and the clutch means.

Fig. 3 shows apertures 7a in the ring 7 for entry of the push rods 13 to the balls 9.

What is claimed is:

1. In a hydraulic brake mechanism; a pressure cylinder, brake setting pistons working in the opposite ends of the cylinder and each having a reduced diameter end, clutch rings having limited sliding motion on the reduced end of the said pistons and having pitched take-up facets and clutch balls thereon, and spring means engaging and constantly thrusting the clutch balls toward effective binding position in the cylinder bore.

2. The mechanism of claim 1; and nuts on said reduced ends for retaining the rings in place and having longitudinal passageways adapted for insertion of means to repress the balls at will.

3. In a hydraulic brake mechanism, a pressure cylinder-fitting piston having an automatic cylinder binding clutch means including a clutching ring confined by piston parts to a small degree of axial shift on the piston and having pitched cam faces and a set of clutch balls cammed outwardly by the said ring faces and a spring device supported on a part of the piston and constantly thrusting the balls in an outward cylinder engaging direction.

4. The mechanism of claim 3, one of the ring confining parts consisting of a retainer ring removably mounted on the piston to facilitate mounting or dismounting of the said ring.

5. In a hydraulic brake mechanism; a pressure piston and a ring non-rotatively slidable thereon and both slidably operative in the bore of a respective cylinder, clutch balls bodily mounted in the ring and thrust outwardly by inclined facets thereof to wedge against adjacent surface of the cylinder bore and spring means yieldably forcing the balls to effective wedging position; the piston having small back-lash in the ring while the latter is wedged by said balls for relief of brake lining from drag when the piston pressure is reduced.

WIEN A. VAN DER WILT.

REFERENCES CITED

The following references are of record in the file of this patent:

UNITED STATES PATENTS

| Number | Name | Date |
| --- | --- | --- |
| 847,164 | Corn | Mar. 12, 1907 |
| 2,138,206 | Rasmussen et al. | Nov. 29, 1938 |
| 2,358,740 | Scott-Iverson | Sept. 19, 1944 |
| 2,417,476 | Finley | Mar. 18, 1947 |